(12) United States Patent
Biagioli et al.

(10) Patent No.: US 11,313,559 B2
(45) Date of Patent: Apr. 26, 2022

(54) METHOD AND DEVICE FOR FLAME STABILIZATION IN A BURNER SYSTEM OF A STATIONARY COMBUSTION ENGINE

(71) Applicant: Ansaldo Energia Switzerland AG, Baden (CH)

(72) Inventors: Fernando Biagioli, Fislisbach (CH); Alessandro Scarpato, Wettingen (CH); Torsten Wind, Hallwil (CH); Khawar Syed, Oberrohrdorf (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 1202 days.

(21) Appl. No.: 15/050,244

(22) Filed: Feb. 22, 2016

(65) Prior Publication Data
US 2016/0252251 A1    Sep. 1, 2016

(30) Foreign Application Priority Data

Feb. 27, 2015    (EP) ..................................... 15156871

(51) Int. Cl.
  *F23R 3/14*    (2006.01)
  *F23R 3/26*    (2006.01)
  (Continued)

(52) U.S. Cl.
  CPC ................ *F23R 3/14* (2013.01); *F02C 7/057* (2013.01); *F02C 7/224* (2013.01); *F02C 9/28* (2013.01);
  (Continued)

(58) Field of Classification Search
  None
  See application file for complete search history.

(56) References Cited

U.S. PATENT DOCUMENTS

| | | | | |
|---|---|---|---|---|
| 1,948,627 A | * | 2/1934 | Peabody ................. | F23C 7/006 431/179 |
| 3,746,499 A | * | 7/1973 | Guerre .................... | F23C 7/002 431/182 |

(Continued)

FOREIGN PATENT DOCUMENTS

| | | |
|---|---|---|
| CN | 102200292 A | 9/2011 |
| CN | 102748775 A | 10/2012 |

(Continued)

OTHER PUBLICATIONS

Santavicca, Dom, and Lieuwen, Tim. Combustion Dynamics in Multi-Nozzle Combustors Operating on High-Hydrogen Fuels. United States: N. p., 2013. Web. doi:10.2172/1178997; https://www.osti.gov/servlets/purl/1178997; also available at https://www.osti.gov/servlets/purl/1178997 (Year: 2013).*

(Continued)

*Primary Examiner* — Gerald L Sung
*Assistant Examiner* — Marc J Amar
(74) *Attorney, Agent, or Firm* — Buchanan Ingersoll & Rooney PC (57) ABSTRACT

The invention refers to a method and a device for flame stabilization in a burner system of a stationary combustion engine, preferably a stationary gas turbine, in which a flow of an air/fuel mixture is produced and being swirled to form a vortex flow to which a swirl number is assignable before entering a combustion zone in which the vortex flow of the air/fuel mixture is ignited to form a flame within a reverse flow zone caused by vortex breakdown. The swirl number perturbation driven by thermoacoustic oscillation inside the burner system is controlled by affecting the vortex flow actively before entering the combustion zone on basis of changing a flame transfer function assigned to the burner (Continued)

system with the proviso of minimizing pulsation amplitudes of the flame transfer function.

11 Claims, 5 Drawing Sheets

(51) Int. Cl.
| | | |
|---|---|---|
| F23C 7/00 | (2006.01) | |
| F23R 3/28 | (2006.01) | |
| F02C 7/057 | (2006.01) | |
| F02C 7/224 | (2006.01) | |
| F02C 9/28 | (2006.01) | |
| F02D 35/02 | (2006.01) | |

(52) U.S. Cl.
CPC ............ *F02D 35/028* (2013.01); *F23C 7/006* (2013.01); *F23R 3/26* (2013.01); *F23R 3/286* (2013.01); *F05B 2260/96* (2013.01); *F23D 2210/00* (2013.01); *F23R 2900/00013* (2013.01)

(56) References Cited

U.S. PATENT DOCUMENTS

| | | | |
|---|---|---|---|
| 3,748,852 A | | 7/1973 | Cole et al. |
| 3,938,324 A | * | 2/1976 | Hammond, Jr. .......... F23R 3/16 60/737 |
| 4,932,861 A | | 6/1990 | Keller et al. |
| 5,373,693 A | * | 12/1994 | Zarzalis .................. F23C 7/006 60/39.23 |
| 5,397,217 A | * | 3/1995 | DeMarche .............. F01D 5/187 415/115 |
| 5,428,951 A | * | 7/1995 | Wilson ................... F23C 99/00 431/1 |
| 5,471,840 A | | 12/1995 | Lovett |
| 5,588,826 A | | 12/1996 | Döbbeling et al. |
| 5,823,764 A | * | 10/1998 | Alberti ................... F23C 7/006 431/184 |
| 6,272,842 B1 | * | 8/2001 | Dean ........................ F23R 3/14 60/39.23 |
| 6,343,927 B1 | * | 2/2002 | Eroglu ..................... F15C 1/22 239/101 |
| 6,405,536 B1 | * | 6/2002 | Ho ........................... F23R 3/14 60/742 |
| 8,015,813 B2 | * | 9/2011 | Cazalens ................. F23R 3/286 431/258 |
| 9,423,133 B2 | * | 8/2016 | Gomez del Campo .. F23R 3/14 |
| 2003/0205048 A1 | | 11/2003 | Hellat |
| 2004/0020208 A1 | | 2/2004 | Knight |
| 2004/0135450 A1 | * | 7/2004 | Kanebako .......... G11B 19/2009 310/90.5 |
| 2007/0042301 A1 | | 2/2007 | Carroni et al. |
| 2009/0139242 A1 | * | 6/2009 | Senior .................... F23C 7/002 60/748 |
| 2014/0013764 A1 | | 1/2014 | Biagioli et al. |
| 2014/0123661 A1 | | 5/2014 | Biagioli et al. |
| 2017/0126087 A1 | * | 5/2017 | Soderberg ................ H02K 1/17 |
| 2017/0254541 A1 | * | 9/2017 | Bottcher ................. F23R 3/20 |
| 2018/0202660 A1 | * | 7/2018 | Chaudhuri .............. F23R 3/286 |

FOREIGN PATENT DOCUMENTS

| | | | | |
|---|---|---|---|---|
| EP | 0 321 809 B1 | | 6/1989 | |
| EP | 0 704 657 B1 | | 4/1996 | |
| EP | 1 070 917 A1 | | 1/2001 | |
| EP | 1 331 447 B1 | | 7/2003 | |
| EP | 1 359 377 A1 | | 11/2003 | |
| EP | 2 685 164 A1 | | 1/2014 | |
| EP | 2 728 260 A1 | | 5/2014 | |
| FR | 1383941 A | * | 1/1965 | .............. F23C 7/006 |

OTHER PUBLICATIONS

Bunce NA, Quay BD, Santavicca DA. Interaction Between Swirl Number Fluctuations and Vortex Shedding in a Single-Nozzle Turbulent Swirling Fully-Premixed Combustor. ASME. J. Eng. Gas Turbines Power. 2013;136(2):021503-021503-11. doi:10.1115/1.4025361 (Year: 2013).*

Daniel Durox, Jonas P. Moeck, Jean-François Bourgouin, Pascal Morenton, Marc Viallon, Thierry Schuller, Sébastien Candel, Flame dynamics of a variable swirl number system and instability control, Combustion and Flame, V 160, I 9, 1729-1742.org/10.1016/j.combustflame.2013. (Year: 2013).*

Arthur Lefebvre, Dilip Ballal, Gas Turbine Combustion Alernative Fuels and Emissions, 2010, CRC Press, Third Ed., pp. 15,16, 141-147,398-400. (Year: 2010).*

Extended European Search Report dated Aug. 19, 2015, issued by the European Patent Office in the corresponding European Patent Application No. 15156871.4-1602. (8 pages).

First Office Action dated May 30, 2019, by the Chinese Patent Office in corresponding Chinese Patent Application No. 201610106086.5, and an English Translation of the Office Action. (14 pages).

* cited by examiner

METHOD AND DEVICE FOR FLAME
STABILIZATION IN A BURNER SYSTEM OF
A STATIONARY COMBUSTION ENGINE

TECHNICAL FIELD

The present invention relates to a method and a device for flame stabilization in a burner system of a stationary combustion engine, preferably a stationary gas turbine, in which a flow of an air/fuel mixture is produced and being swirled to form a vortex flow to which a swirl number is assignable before entering a combustion zone in which the vortex flow of the air/fuel mixture is ignited to form a flame within a reverse flow zone caused by vortex breakdown.

Thermal acoustic oscillations are currently one of the major concerns for gas turbine manufactures. When the heat release from the flame is coupled with the acoustics of the combustion chamber very high perturbation amplitudes can occur with detrimental effects on the life time at least of the combustor. Very often, thermal acoustic oscillations strongly limit the efficiency and significantly deteriorate emission values of the engine thus representing an additional difficulty for low NOx operation.

BACKGROUND OF THE INVENTION

During operation, pressure oscillations may be generated that could cause mechanical damages to the combustion chamber and limit the operating window. Nevertheless, the frequency of these pressure oscillations may slightly change from gas turbine to gas turbine and, in addition, also for the same gas turbine it may slightly change during gas turbine operation, for example at part load, base load, during transitions etc.

Mostly gas turbines have to operate in lean mode for compliance to pollution emissions. The burner flame during this mode of operation is extremely sensitive to flow perturbations and can easily couple with the acoustics of the combustion chamber which may lead to thermo-acoustic instabilities. For this reason, usually burner systems are provided with damping devices which can be divided into active and passive damping systems. Passive damping systems like Helmholtz dampers are commonly implemented in burner systems which however have few draw backs, for example the requirement of large damping volumes for low frequencies which leads to issues with costs and available space. Moreover the absorption bandwidth of Helmholtz dampers is typically narrow and thus such damper systems are sensitive to detuning. Additional precaution must be taken concerning the prevention of ingestion of hot gases.

Active damping techniques are often based on the control of fuel mass flow rate and fuel distribution into the combustion chamber.

For example U.S. Pat. No. 3,748,852 A discloses a self-stabilized pressure compensated injector with fluidic oscillators having two outlets, both of which discharge into a combustion chamber. Fuel flow oscillates between the outlets and the flows therein are responsive to pressure variations in the combustion space.

EP 1 070 917 A discloses fluidic oscillators having two outlets, both referring to of discharge into a combustion chamber or mixing tube. Fuel flow is switched between the outlets by pressure fluctuations in the control inlets, which are dictated either by a separate controller or by a closed circuit feedback between the control inlets.

EP 1 331 447 B1 discloses a similar fluidic oscillator having two outlets but one of which is coupled by a feedback line with a fluidic control arrangement.

All known technical solutions for reducing or preventing generation of thermal acoustic oscillations in burner systems of stationary gas turbine engines are restricted to influence pressure oscillations inside the combustion chamber by varying the resonance property of the combustion chamber by acoustical coupling of Helmholtz resonators or by actively interfering pressure oscillations inside the combustion chamber by an anti-cyclically impact of modulated mass flow into the combustion chamber directly.

In most burner systems so called premix-burners are used in which a vortex flow of an ignitable air fuel mixture is generated before entering the combustor in which the vortex flow breaks down and forming a central revers flow zone (CRZ) which allows anchoring of the premix flame. For vortex generation different types of premix burner arrangement exist. Conically shaped premix burner comprising at least two part-cone bodies which enclose a conically expanding burner volume and limit tangential air inlet slots and feed channels for gaseous or liquid fuels, for creating a vortex flow of an air/fuel mixture, see for example EP 0 321 809 B1, in which a conical burner arrangement is disclosed being connected with the combustor zone directly.

EP 0 704 657 B1 discloses a conical premix burner arrangement having a mixing tube between the premix burner and the combustor additionally. The swirl intensity of the vortex flow can be expressed by the swirl number resulting from the arrangement of the corresponding cone angle, the air inlet slots and the number thereof.

Alternatively or in combination with a conically shaped premix burner a vortex flow of an air/fuel mixture can be formed or enhanced by an extra swirl unit, hereinafter referred to briefly swirler. There are axial swirler as disclosed for example in EP 2 728 260 A1 or EP 2 685 164 A1 or rotational swirler see for example EP 1 359 377 A1.

SUMMARY OF THE INVENTION

Based on a burner system of a stationary combustion engine, preferably a stationary gas turbine, in which a flow of an air/fuel mixture is produced and being swirled to form a vortex flow which is ignited to form a flame within a reverse flow zone caused by vortex breakdown, it is an object to enhance flame stabilization significantly using cost-minimized arrangements. Preferably such arrangements shall be upgradable in already existing burner systems as well integrable in new burner systems with little extra effort.

The object is achieved by the sum total of the features of claim 1 which concerns to a method for flame stabilization in a burner system of a stationary combustion engine. Claim 13 is directed to a device for flame stabilization in a burner system. The invention can be modified advantageously by the features disclosed in the sub claims as well in the following description especially referring to preferred embodiments.

The invention is based on the consideration that flame stabilization in modern stationary gas turbine combustors is realized via the use of swirled burners basically. These known burner systems impart a strong swirl component to the flow of reactance that leads to the generation of the CRZ by a known vortex breakdown mechanism. In the vicinity of the CRZ the flow velocities are as low as the turbulent flame speed, a very favourable condition for flame anchoring. Given these stabilization properties, the flame dynamics characteristics are mostly driven by the dynamics response characteristics of the CRZ, which are influenced mainly by formation of thermal acoustic oscillations in the burner system.

It is known from the open literature that swirl number perturbations from the swirl burner have significant effect on the flame transfer function, abbreviated FTF. The swirl number describes the degree of swirl of a vortex flow. The swirl number is defined by the ratio of the momentum of tangential velocity component and momentum of axial velocity component. The FTF describes the change in the rate of heat release in response to perturbations in the inlet flow as a function of frequency, i.e. it is a quantitative assessment of the susceptibility of combustions to disturbances.

In particular FTF shows maxima and minima in amplitude that are separated by a phase shift in swirl number perturbation equal to 180°. The frequency difference $\Delta f$ between a maximum and minimum value of the FTF is given by the ratio between the bulk velocity of the vortex flow between the swirler and CRZ and twice the distance between the swirler and CRZ. For typical industrial gas turbines the distance between swirler and CRZ, which in most cases is defined by the length of a mixing tube, measures 0.2 m and the bulk velocity of the vortex flow is about 60 m/s, so that the frequency difference $\Delta f=60/(2\times 0.2)=150$ Hz. The frequency range of interest in which thermo acoustic oscillations occur and mainly affect the whole burner system ranges between 0 and 300 Hz so that the before mentioned sequence of maxima and minima it is usually limited to just a single maximum at approx. 150 Hz followed by a minimum. This sequence however, is clearly visible for longer but also unrealistic residence times within the mixing tube ranging between 12 and 15 ms (i.e. $\Delta f=1/0.024=40$ Hz)

What happens if the phase of the swirl number perturbation however is controlled actively in case of realistic short mixing tube length of about 0.2 m. By using computational fluid dynamics evaluations (CFD) it was obtained that by artificially altering the amplitude and phase of the tangential velocity perturbation at the swirler exit a significant peak reduction of FTF amplitude can be reached, i.e. the amplitude of flame oscillation, which is a passive response of the flame to the thermal acoustic oscillation within the burner system, can be reduced clearly by which additionally burner efficiency and burner emissions can be optimized.

Figure 1A:
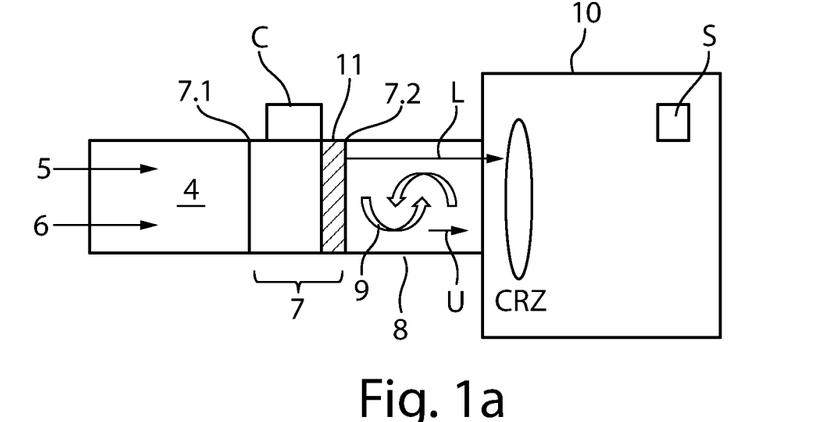
Figure 1B:
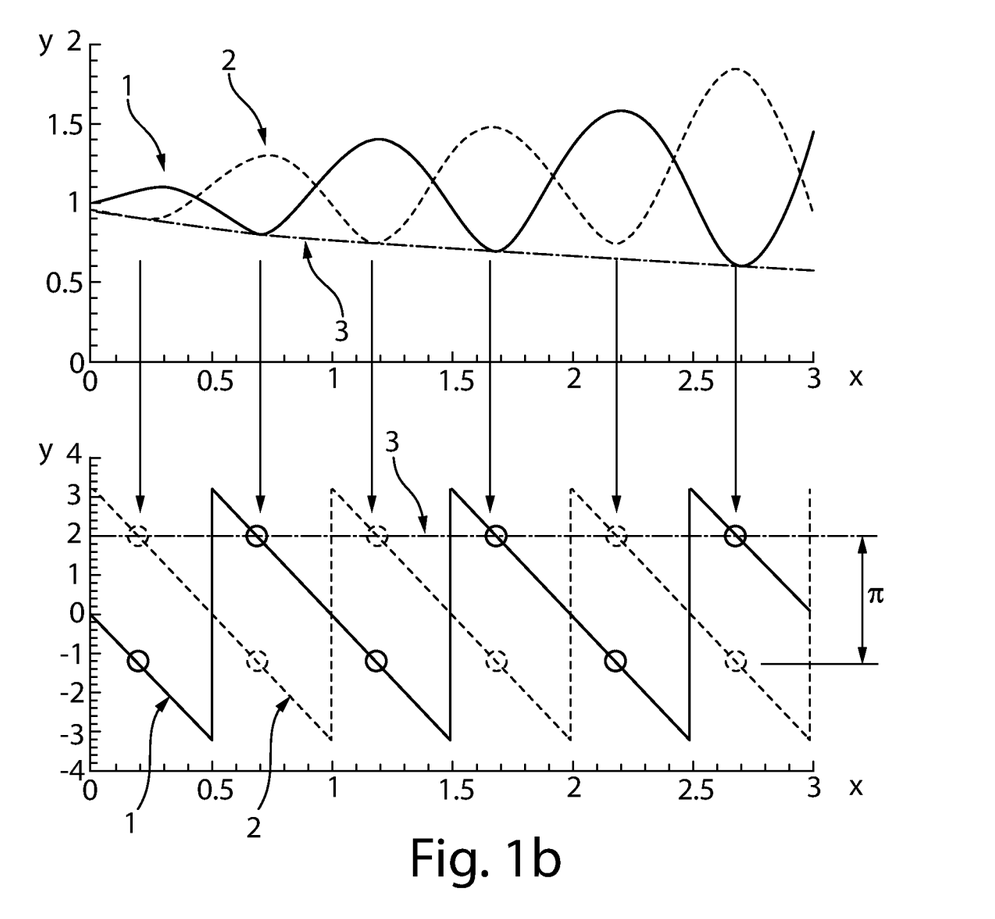

Numerical results from CFD shown in FIG. 1b illustrates the strong influence of an active control of the swirl number perturbation onto the FTF amplitude. Results (y-axis) are given versus frequency non-dimensionalized (x-axis) with the inverse of residence time between swirler exit and apex of the CRZ. Assuming typical maximum frequency of interest in gas turbines equal to 300 Hz and residence times of 4-5 ms yields maximum non-dimensionalized equal to 1.2-1.5. Higher values of non-dimensional frequency corresponding to higher maximum frequency and/or longer mixing sections, which allow a better understanding of the problem, are instead of academic interest.

The top diagram in FIG. 1b represents FTF amplitude (y-values) while the bottom one the phase of swirl number perturbation (y-values) at the apex of the CRZ (end of mixing section). Functions 1 refer to the case without control of the swirl number perturbation (passive behaviour), functions 2 refer to the case where the swirl number perturbation is actively opposed to the passive case values versus frequency. Altering the phase in this way gives the remarkable result that maxima in amplitude of the FTF for the passive case (occurring at phase of swirl equal to −1.1 rad, see lower diagram) are converted into minima while minima (occurring at phase of swirl equal to 2 rad, hence shifted by $\pi$ with respect to the maxima) are converted into maxima.

Actively modulating the phase of swirl to the optimal value of 2 rad gives instead a minimum value of the FTF amplitude across all the frequency range (functions 3). The control of swirl number perturbation allows therefore a significant reduction in the amplitude of the flame dynamic response. It must be observed that the optimal phase of 2 rad is not a universal value but depends from the characteristics of CRZ and flame stabilization.

The before disclosed awareness shows that velocity fluctuations generated at the exit of the swirl burner, if taken under control, represent a powerful screw for mitigating flame dynamics in gas turbine combustors. The inventive concept therefore consists in an operating concept for burner systems of a stationary combustion engine, preferably a stationary gas turbine that allows reducing combustion dynamics by actively controlling swirl number perturbation at the exit of swirl burners.

The inventive method for flame stabilization in a burner system, preferably of a stationary gas turbine according to the features of the preamble of claim 1 is therefore characterized in that swirl number perturbation driven by thermoacoustic oscillation inside the burner system is controlled by affecting the vortex flow actively before entering the combustion zone on basis of changing a flame transfer function assigned to the burner system with the proviso of minimizing pulsation amplitudes of the flame transfer function.

Basically the invention can be applied to all types of swirl burner concepts and with a huge number of different types of control methods or mechanisms for influencing the swirl number perturbation.

Typically the swirler swirls the flow of air/fuel mixture with a given swirl strength which is indicated by a swirl number depending on structural design of the swirler itself. As mentioned above there are conical, axial and radial types of swirler all providing an inlet and an exit. In a preferred embodiment the active control of the vortex flow will be performed at the exit of the swirler by influencing the flow dynamics of the vortex flow. Preferably affecting the vortex flow actively a velocity fluctuation characterized by phase and amplitude is embossed on said vortex flow such, that the phase of the velocity fluctuation is at least altered, preferably inverted to the phase of the FTF at least at one phase position on which an amplitude maximum of the FTF occurs. Preferably the vortex flow at the exit region of the swirler will be influenced by deviating at least the phase of the tangential velocity fluctuation respectively perturbation downstream the swirler from its natural value given by $\phi=-2\pi f L/U_B$ with L=distance between swirler exit and CRZ and U=bulk velocity of the vortex flow between swirler and CRZ and f frequency.

Affecting the vortex flow perturbation at the end of the swirler actively can be performed as well in an open-loop based on information determined during commissioning of the burner system or in a closed-loop condition, based on information measured sensorial, preferably based on pressure prevailing in the combustion zone of burner system.

There are several technical possibilities for affecting the vortex flow actively, for example by harmonically modulating shape and/or position of the swirler inside the burner system and/or by controlling the vortex flow releasing the swirler either by modulated injection of at least one separate fluid flow into the vortex flow or by modulated altering the flow velocity of the vortex flow in the vicinity of swirler contour surfaces.

As will be described later harmonically modulating of the shape and/or position of the swirler can be realized by means of frictionless magnetic levitation in which the swirler provides several rigid swirler body segments which at least can be tilted and/or moved back and forth periodically on basis of frictionless magnetic the levitation. This concept affords that no additional fluid flow directed into the vortex flow is necessary.

On the other hand an active control of the vortex flow perturbation at the swirler exit end even can be realized by injection of at least one separate fluid flow, for example at least one flow of air, flow of fuel, flow of an air-fuel mixture or a flow of combustion products into the vortex flow by means of a controllable fluid device or rotating valve. In case of axial or radial swirler in which swirler vanes or bodies are arranged, each providing a trailing edge, small part of air or fuel or combustion products obtained by mixing and burning small amount of fuel and air can be injected at or near the trailing edge into the vortex flow to generate a fluid-dynamical impact onto the tangential velocity perturbation of the vortex flow which emits said swirler. In one preferred embodiment exit openings on the swirler vane surface in the region of the trailing edge are provided at the pressure and suction side so that fluid flows emit at both vane sides harmonically tuned to each other by modulation which can be operated via a fluid device or an external rotating valve which will be described in more detail in combination with the figures.

An alternative method for affecting the dynamics of the vortex flow at the swirler outlet is to alter the flow velocity of the vortex flow in the vicinity of swirler contour surfaces, for example by means of dielectric barrier discharge or by injecting synthetic jets by means of piezoelectric or hot gas plasma generation. The before mentioned techniques will be described in more detail by referring to embodiments shown in figures.

Affecting the dynamics of the vortex flow will be actively controlled by a control unit which provides information of swirl number perturbation driven by thermo-acoustic oscillation inside the burner system either determined during commissioning of the burner system, said information being stored preferably in a lookup table or said information are sensor signals measured by at least one sensor, preferably by a pressure sensor measuring pressure values prevailing in the combustion zone of the burner system.

The control unit actively controls means for affecting the vortex flow. Said means are integrated into the swirler in different ways depending on swirler type and technical function of said means.

In case of an axial swirler providing swirler-vanes each of which has a trailing edge, in a preferred embodiment the means are arranged at and/or close to the trailing edge and configured to generate a fluid-dynamical impact onto a tangential velocity perturbation of the vortex flow which emits said axial swirler.

An alternative mean concerns an electromagnetic arrangement which is applicable to an axial swirler also. Here the swirler-vanes are arranged rotationally around one common axis of rotation, and the mean is an actively controlled means of frictionless magnetic levitation that rotates the axial swirler vanes around said axis of rotation in opposite directions of rotation alternately.

In case of a radial swirler providing flow bodies which limit a flow channel in pairs, the means of affecting the vortex flow are arranged at the flow bodies along the flow channels not even necessarily at the downstream end of the flow bodies.

As will be described in more detail hereinafter the further possible means of affecting the vortex flow actively may comprise at least one of the following units:

An outlet opening through which a fluid jet of air, fuel and/or combustion products emits into the vortex flow under control of a rotating valve or a fluid device, a dielectric barrier discharge unit being applied onto a surface of the swirler, a synthetic jet generator comprising a cavity within said swirler providing a piezoelectric driver or hot plasma generator to generate the synthetic jet through an opening of the cavity into the vortex flow.

All the before means can be integrated into swirler separately or in combination.

BRIEF DESCRIPTION OF THE FIGURES

The invention shall subsequently be explained in more detail based on exemplary embodiments in conjunction with the drawings. In the drawings FIG. 1a schematic burner system for operating a stationary gas turbine which comprise a premix burner with a actively controlled means for affecting the vortex flow perturbation FIG. 1b diagram illustrating the effect on FTF amplitude of altering the phase of swirl number perturbation at swirler exit, FIG. 2 cross sectional view through a swirler vane providing flow openings at the pressure side and suction side for harmonic modulation of flow between pressure and suction side, FIG. 3a, b embodiments for modulation of active control flow rate between pressure and suction sides of a swirler vane, FIG. 4 rotating valve for modulation of active control flow rate between pressure and suction side of a swirler vane, FIG. 5a,b,c schematic cross section of means for flow separation for redirection of main flow via trailing edge jets, FIG. 6a, b illustration of an active control of flow separation via dielectric barrier discharge, FIG. 7a, b, c illustration of piezoelectric and hot plasma generators arranged in the region of the trailing edge of a swirler vane, FIG. 8 schematic cross sectional view through a conical shapes premix burner providing means for dynamically modulating flow passage area and FIG. 9a, b schematic view of sections of flow bodies of a radial swirler providing dynamically modulated flow passage area.

DETAILED DESCRIPTION OF EXEMPLARY EMBODIMENTS

FIG. 1a shows a schematic burner system preferably for operating a stationary gas turbine which comprise a premix burner 4 into which an air flow 5 and a fuel flow 6 is directed in which both flows are mixed for providing a homogenous air-fuel mixture. Said flow of air/fuel mixture will be swirled in case of a conically shaped premix burner by the premix burner 4 itself and/or by an additional swirler 7 providing a swirler inlet 7.1 and swirler outlet 7.2. Typically downstream the swirler 7 a mixing tube 8 is arranged along which the vortex flow 9 establishes before the vortex flow breaks 9 down by entering the combustor 10 forming a central revers flow zone CRZ in which the flame will occur. FTF which was already discussed in combination with FIG. 1b depends on the distance L between the swirler 7 and CRZ as well on the bulk velocity U of the vortex flow 9 along the mixing tube 8.

For affecting the vortex flow 9 actively before entering the combustor 10 the swirler provides means, preferably at the swirler exit 7.2, in which said means change the FTF assigned to the burner system with a proviso of minimizing pulsation amplitudes of the flame transfer function. Hereto a control unit C controls the means 11 actively either on basis of stored information and/or on basis of currently measured operation values of the burner system, preferably on basis of sensor signals of a pressure sensor S inside the combustor 10.

Figure 2:
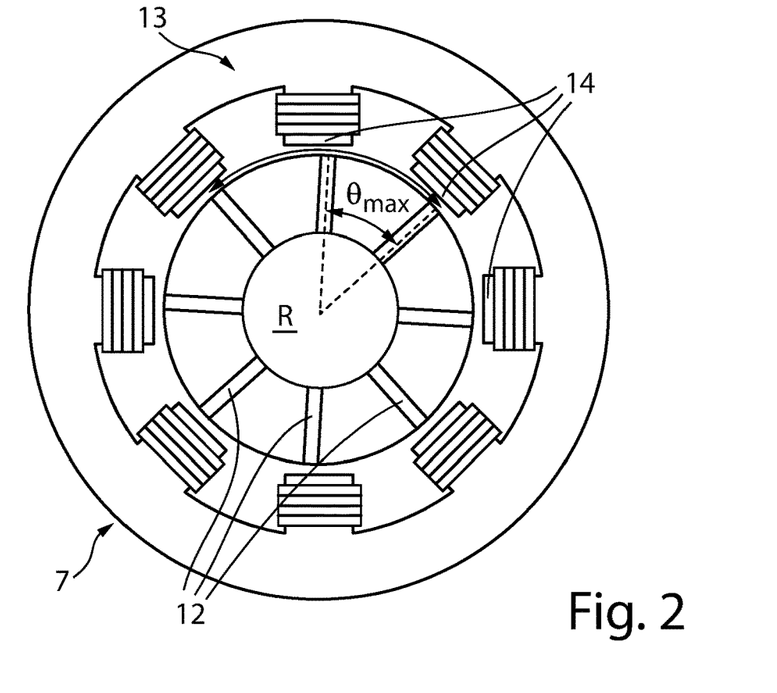

In FIG. 2 one embodiment of the means for affecting the vortex flow actively is illustrated. In case of FIG. 2 the swirler 7 is an axial swirler providing swirler vanes 12 being arranged circumferentially around an axis of rotation R. Said arrangement of swirler vanes 12 are positioned contactless within an electromagnetic arrangement 13 providing electromagnetic poles 14 which are activated such that the electromagnetic field between the electromagnetic poles 14 interacts with the arrangement of swirler vanes 12 such that the swirler vanes 12 may swing periodically clockwise and counter clockwise within an angle range given by $+-\Theta_{max}$. The amount of the angle range and the frequency of the rotatory back and force motion is tuned such to reach a significant reduction of the amplitude of the FTF.

Figures 3A, 3B:
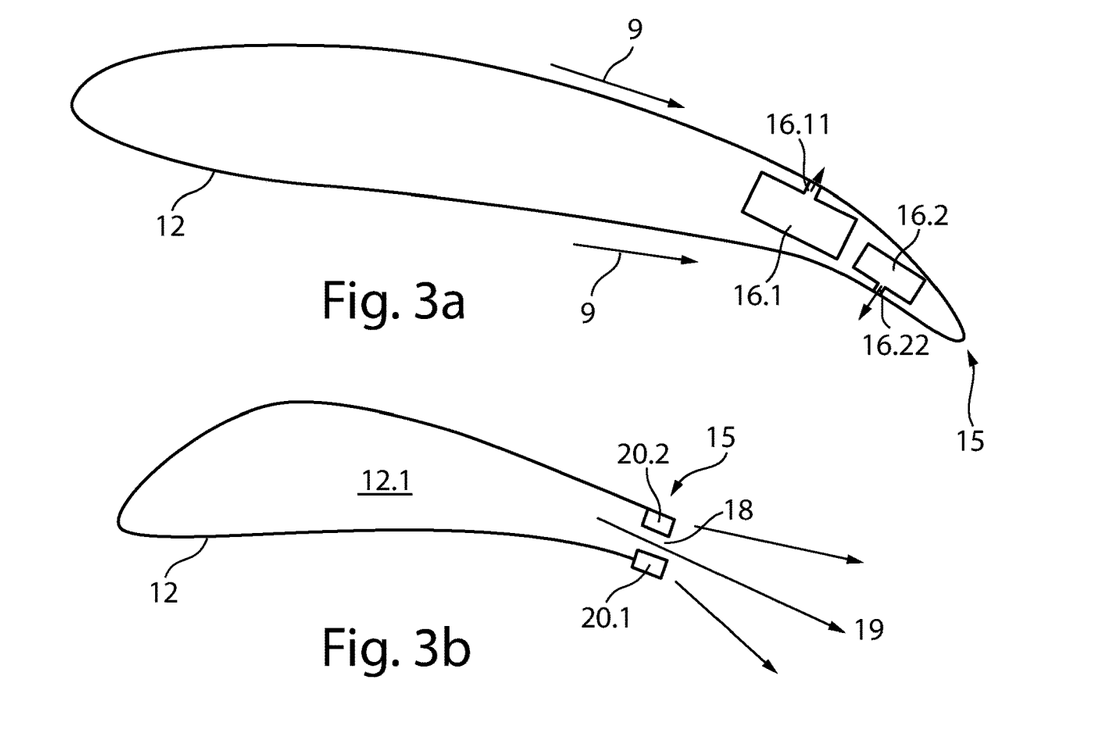

FIG. 3 shows a cross sectional view of a swirler vane 12 providing a trailing edge 15. Inside the swirler vane 12 in the region of the trailing edge 15 two separate chambers 16.1 and 16.2 are provided. Chamber 16.1 provides at least one flow opening 16.11 directed to the suction side of the swirl vane 12 and chamber 16.2 provides at least one flow opening 16.22 at the pressure side of the swirler vane. Preferably both chambers provide a multitude of openings being distributed at least in portions along the axial extension of the swirler vane 12.

Both chambers 16.1 and 16.2 are pressurized with a fluid, for example air, fuel or an air-fuel mixture which can be emitted through the chamber openings 16.11, 16.22 under control. Both flow directions are directed more or less perpendicularly to the main vortex flow 9 which passes through the swirler 7. The impact of the additional fluid flow emitted through the chamber openings 16.11, 16.22 onto the vortex flow 9 affects the tangential velocity perturbation significantly. In a preferred way the fluid flows which are emitted through the chamber openings 16.11, 16.22 are tuned to each other such that the sum total of the fluid flow emitted through all chamber openings is constant. The fluid flow towards the pressure side and also towards the suction side of the swirler vane 12 is harmonically modulated under the proviso that the impact onto the vortex flow 9 associated herewith leads to a velocity fluctuation of the vortex flow 9 so that the phase of the velocity fluctuation of the vortex flow 9 is inverted to the phase of the FTF at least at one phase position on which an amplitude maximum of the FTF occurs.

Figure 4:
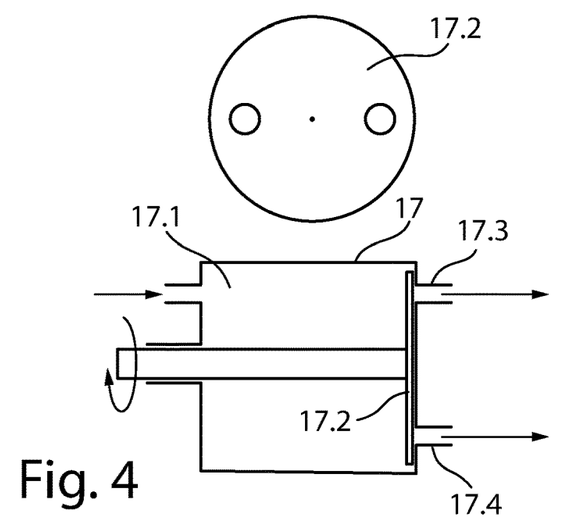

The harmonically modulation of the fluid flows from each chamber 16.1, 16.2 through the chamber openings into the vortex flow can be realized by a rotating valve 17 which is illustrated in FIG. 4 providing a pressurized flow chamber 17.1, in which a hole aperture 17.2 is arranged rotatable for opening one of two outlet ports 17.3, 17.4 alternately.

FIG. 3b shows a schematic cross section of a swirler vane 12 which encloses a fluid chamber 12.1 which opens along a slit 18 at the trailing edge 15. Through the slit 18 pressurized fluid emerges in form of a main flow 19 which is not deviated normally. At the trailing edge 15 two opposite actuators 20.1 and 20.2 are arranged which have influence on the dynamics of the main flow 19 when being activated by the control unit. The actuators 20.1 and 20.2 being activated harmonically such that the main flow 19 will deviate towards the suction side or towards the pressure side of the swirler vane 12. The amount and the dynamics of the harmonically modulation of the main flow 19 leads to an impact onto the vortex flow 9 in a way described before with the proviso of minimizing pulsation amplitudes of the flame transfer function.

Figure 5A:
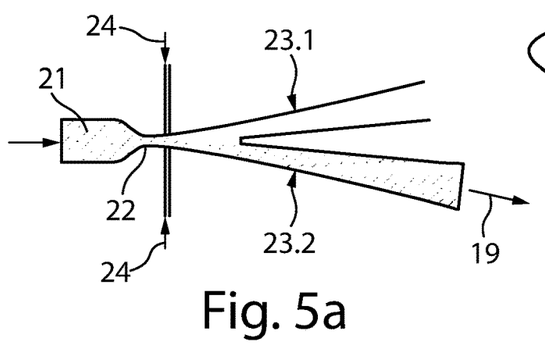

FIG. 5a shows one example for affecting the flow rate of a main stream 19 emitting straight of the trailing edge of a swirler vane 12. Starting from a pressurized fluid chamber 21 providing one outlet port 22 which divides into two separate flow channels 23.1, 23.2, the amount of fluid flow through each of the flow channels 23.1 and 23.2 can be controlled by a little control flow 24 which enters the outlet port 22 perpendicularly to the flow direction either from above or below or both. In case of a control flow from the upper side, the main stream 19 will follow the below outlet port 23.2, as shown in FIG. 5a. This mechanism is also known as Coanda effect. On basis of the Coanda effect fluidic devices 20.1, 20.2 shown in FIG. 3b can be realized.

Figure 5B:
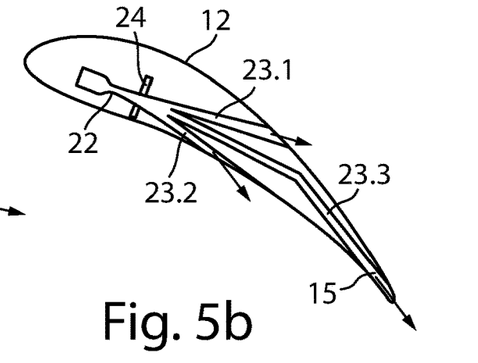

An alternative fluidic device for modulation of active control of flow rate is illustrated in FIG. 5b. Here a cross sectional view of a swirler vane 12 is shown. Within the swirler vane 12 a pressurized fluid chamber 21 is provided having an outlet port 22 which divides into three different flow channels 23.1, 23.2 and 23.3. Further a control flow device 24 is arranged in the region of the outlet port 22. In case of an inactivated control flow device 24 the main flow will leave via flow channel 23.3 which opens at the trailing edge 15 of the swirler vane 12. Depending on activation of the control flow device 24 the flow shares which flow through the individual flow channels 23.1, 23.2, 23.3 can be set individually. The control flow device 24 can be realized by a pressure device or by a plasma or piezoelectric device which generates a pulsed jet as will be described in more detail below.

Figure 5C:
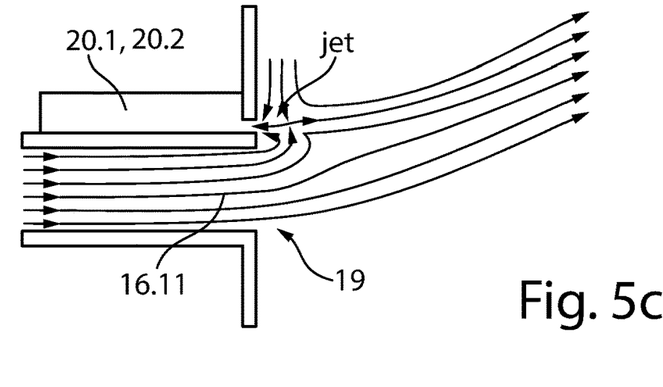

FIG. 5c shows an embodiment of flow affection onto a primary flow 19 emerging out of an outlet opening 16.11 or 16.22 like in case of embodiment shown in FIG. 3a. An actuator 20.1/20.2 generates a synthetic jet which influences the propagation performance of the main flow 19. In case of jet generation the flow resistance in the region of the jet rises due to local turbulences so that the main stream 19 is deflected in direction of the jet, see FIG. 5c.

Figures 6A, 6B:
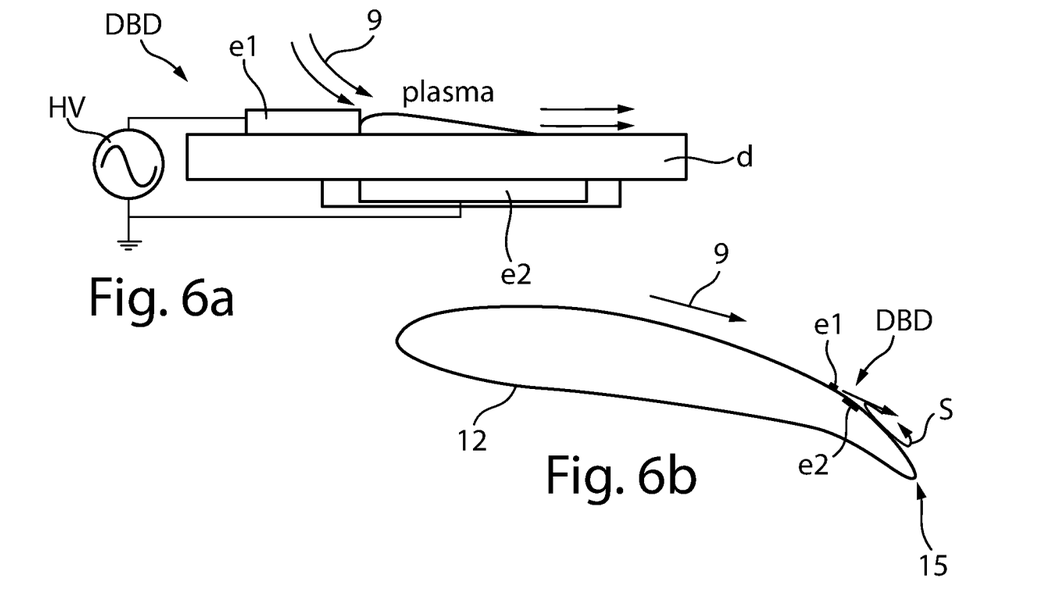

FIG. 6a shows a dielectric barrier discharge device DBD which can be positioned onto the swirler vane 12 in the region of the trailing edge 15 to influence the vortex flow 9 which passes over each swirler vane 12, see FIG. 6b. The DBD provides a first electrode e1 placed onto the surface of the swirler vane 12 being in contact with the main flow 9. A second electrode e2 is buried into the vane 12 and being separated from the first electrode e1 by a dielectric material d. In case of activating the DBD high voltage HV is applied between both electrodes e1, e2 so that plasma is generated which induces via a drag effect an additional velocity into the main flow main 9. In case of activation of the DBD the main flow 9 separates from the surface of the swirler vane 12 near the trailing edge 15 due to formation of an additional swirl effect s. Depending on the activation of the DBD the main flow 9 can be modulated harmonically between separation of the main flow 9 from the vane's surface and re-attachment to it.

Figure 7A:
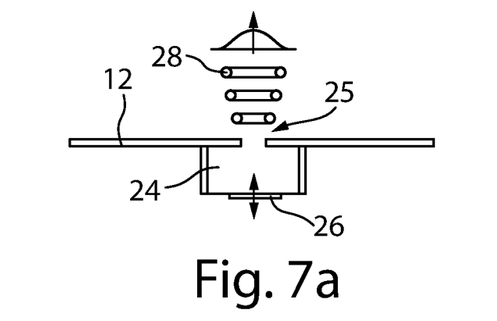

FIG. 7a, b, c illustrates a further alternative of a flow device acting onto the vortex flow directly or acting as a flow separator onto a main flow 19 as it is illustrated for example in FIG. 3a.

Concerning FIG. 7a it is assumed that directly below a surface of a swirler vane 12 at least one closed chamber 24 is provided having an outlet opening 25 at the surface of the swirler vane 12 near the trailing edge. A metal disc 26 is attached opposite to the outlet opening 25 as a part of the chamber wall. The metal disc 26 is driven by a piezoelectric driver (not shown) so that the metal disc 26 can be deflected in direction towards the outlet opening 25 and in opposite direction. By actuating the piezoelectric driver jet pulses 28 emits through the outlet opening 25 having an impact of the vortex flow.

Figure 7B:
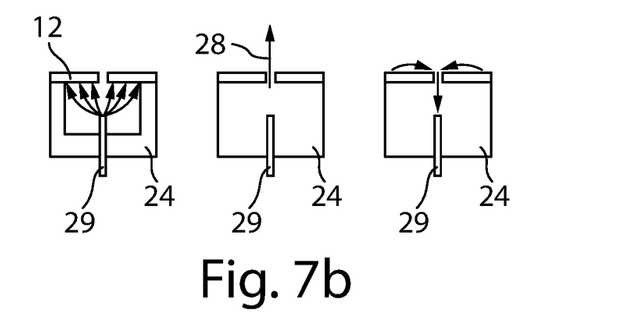
Figure 7C:
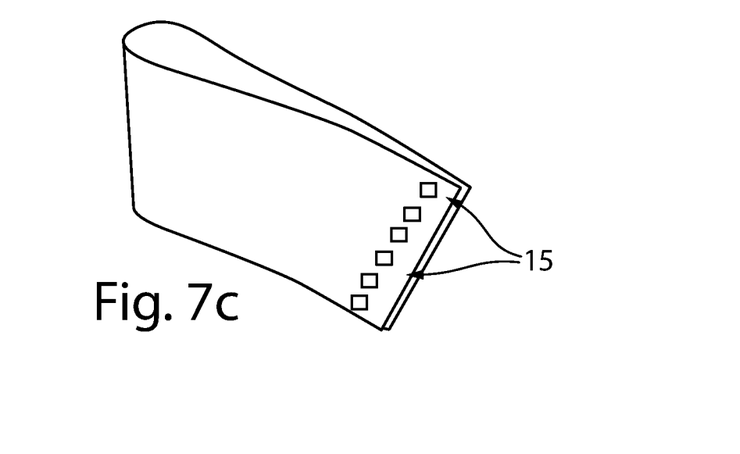

FIG. 7b shows an alternative device which also provides a closed chamber 24 beneath the surface of a swirler vane 12 in which a plasma generation device 29 is arranged. In case of activating the plasma generator, see stage 1, jet pulses 28 emits through the outlet opening 25 into the area of the vortex flow, see stage 2. Due to pressure equalization a revers flow takes place after the discharge step shown in stage 3. The devices shown in FIGS. 7a and b can be arranged along the trailing edge 15 of the swirler vane 12 distributed axially along the trailing edge 15 as shown in FIG. 7c.

Figure 8:
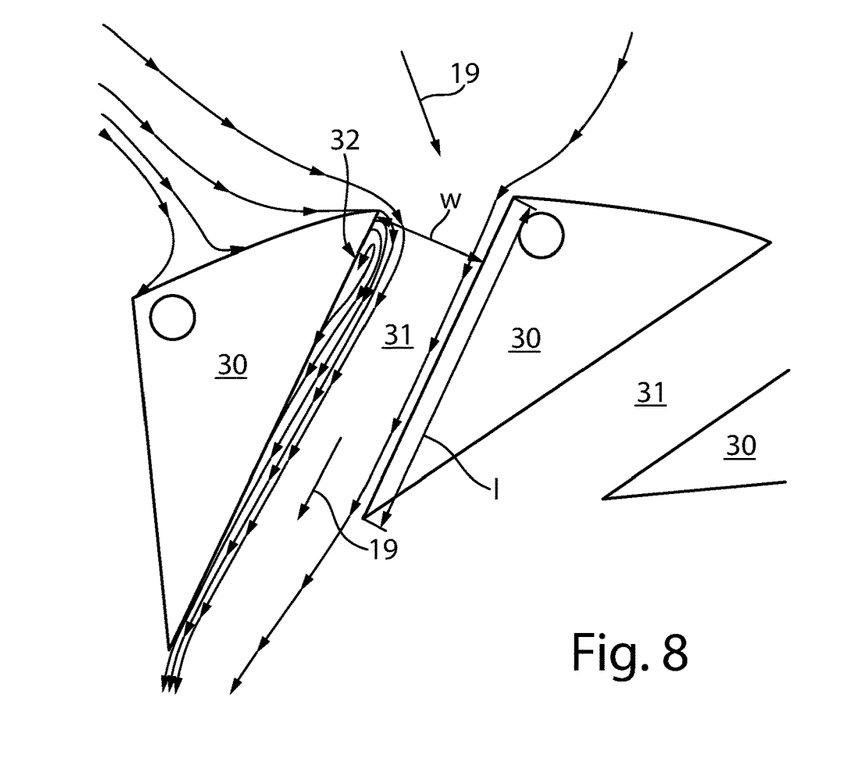

FIG. 8 discloses a part view of a radial swirler in which two flow bodies 30 are shown bordering a flow channel 31 in between. The swirler effect onto the main stream 19 which flows between two neighbouring flow bodies 30 depends on the width w the length l and the orientation of the body flanks relative to the main flow direction. For affecting purposes onto the flow performance of the vortex flow which exits the radial swirler means 32 for affecting the vortex flow 19 are arranged at least at one of the flow bodies 30 along the flow channel 31. The means 32 of affecting the vortex flow influences the flow dynamics of the flow through each flow channel 31. For example by providing a synthetic jet generator, such as a piezoelectric driver unit as explained in FIG. 7a or a plasma generator as explained in FIG. 7b a dynamical impact can be performed onto the main flow 19 passing through the flow channel 31. In fact by activating such means 32 of affecting the vortex flow dynamically modulating the flow passage area between the two neighbouring flow bodies 30 along the flow channel 31 can be realized.

Alternative or in combination with the synthetic jet generators in form of a piezoelectric driver or hot gas plasma generator a dielectric barrier discharge unit as described in FIG. 6 can be applied onto the surface of the swirler body of a radial swirler unit shown in FIG. 8. Also it is possible to provide outlet openings through which a fluid flow can be injected into the flow channel 31 as described in combination with the embodiment shown in FIG. 3a.

Figure 9A:
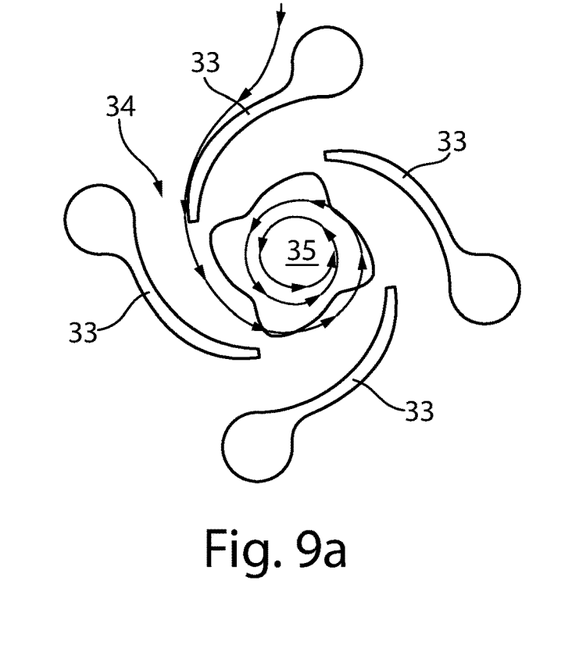
Figure 9B:
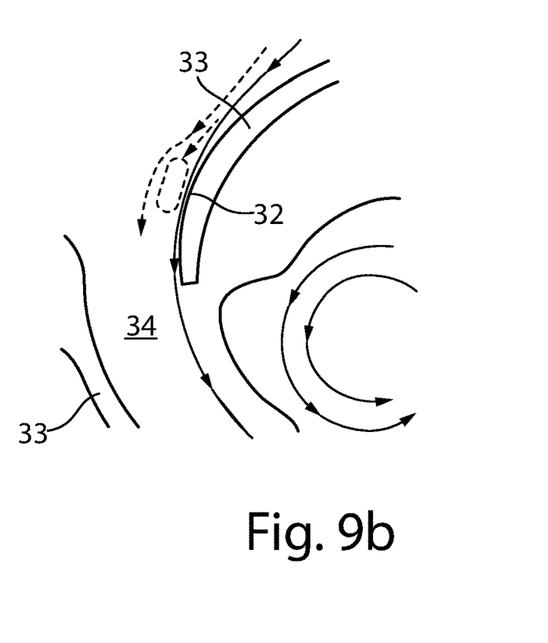

FIG. 9a shows a cross section through a cone shaped premix burner providing four cone shaped shells 33 enclosing in pairs so called inlet slots 34 through which air and/or fuel and/or air/fuel mixture is injected into the conical burner space 35 in which a vortex flow establishes. FIG. 9b shows a detailed section of two neighbouring burner shells 33 bordering one inlet slot 34. One of the two burner shells 33 provides at its surface a means 32 for affecting the vortex flow. The means 32 influences the flow performance within the flow passage area along the inlet slots 34. Like described before the means 32 can be realized by synthetic jet generators or outlet opening for injecting a fluid flow into the inlet slots.

LIST OF REFERENCE NUMEROUS 1 flame transfer function FTF
2 modified flame transfer function
3 modified flame transfer function
4 premix burner
5 air flow
6 fuel flow
7 swirler
7.1 swirler entrance
7.2 swirler exit
8 mixing tube
9 vortex flow
10 flame, CRZ
11 means for affecting the vortex flow actively
12 swirler vane
13 electromagnetic arrangement
14 electromagnetic pulse
15 trailing edge
16.1, 16.2 Chamber
16.11, 16.22 opening
17 rating valve
17.1 flow chamber
17.2 outlet port
17.3 outlet port
18 slit
19 main flow
20.1, 20.2 actuators
21 pressurized fluid chamber
22 outlet port
23.1, 23.2, 23.3 flow channel
24 control flow device
25 outlet opening
26 metal disc
27 piezoelectric driver
28 jet pulses
29 plasma generator
30 flow body
31 flow channel
32 means for affecting the vortex flow
33 burner shell
34 inlet slot
35 conical burner space
DBD Dielectric barriers discharge
e1, e2 First and second electrode
S Additional swirl
D Dielectric material
HV High voltage

The invention claimed is:

1. A method for flame stabilization in a burner system of a stationary combustion engine, the method comprising:
producing a flow of an air/fuel mixture;
swirling the flow to form a vortex flow to which a swirl number is assignable before the vortex flow enters a combustion zone;
igniting the vortex flow of the air/fuel mixture to form a flame within a reverse flow zone caused by vortex breakdown; and
controlling a swirl number perturbation driven by thermoacoustic oscillation inside the burner system by affecting the vortex flow actively before the flow enters the combustion zone on basis of changing a flame transfer function assigned to the burner system with a proviso of reducing pulsation amplitudes of the flame transfer function, wherein the pulsation amplitudes are associated with a change in amplitude of flame oscillation, wherein actively affecting the vortex flow includes harmonically modulating a shape or position of a swirler by frictionless magnetic levitation using an electromagnetic field acting on the swirler.

2. The method according to claim 1, wherein swirling of the flow of air/fuel mixture takes place within the swirler having a swirler inlet and a swirler exit, and actively affecting the vortex flow is performed at the exit of the swirler by influencing flow dynamics of the vortex flow.

3. The method according to claim 1, wherein actively affecting the vortex flow is performed by embossing a velocity fluctuation characterized by phase and amplitude on said vortex flow such that the phase of the velocity fluctuation is altered to the phase of the flame transfer function at least at one frequency position on which an amplitude maximum of the flame transfer function occurs.

4. The method according to claim 2, wherein embossing a velocity fluctuation on said vortex flow is carried out by influencing amplitude and phase of a tangential velocity perturbation of the vortex flow at the swirler exit.

5. The method according to claim 1, wherein actively affecting the vortex flow is performed in an open-loop based on information determined during commissioning of the burner system.

6. The method according to claim 1, wherein actively affecting the vortex flow is performed in a closed-loop based on information measured sensorial based on pressure prevailing in the combustion zone.

7. The method according to claim 1, wherein a modulated injection of at least one separate fluid flow is realized by injecting at least one flow of air, flow of fuel and/or flow an air/fuel mixture into the vortex flow by a controllable fluidic device or rotating valve.

8. The method according to claim 1, wherein a modulated injection of at least one separate fluid flow is realized by injecting of a flow of combustions products into the vortex flow by harmonically ignition of an ignitable flow of reactants.

9. The method according to claim 1, wherein altering a flow velocity of the vortex flow in the vicinity of swirler contour surfaces is realized by inducing a fluid flow by dielectric barrier discharge at least in an area along the swirler contour surfaces.

10. The method according to claim 2, wherein actively affecting the vortex flow further includes controlling the vortex flow being released from the swirler by modulated injection of at least one separate fluid flow into the vortex flow.

11. The method according to claim 2, wherein actively affecting the vortex flow further includes controlling the vortex flow being released from the swirler by modulated altering of flow velocity of the vortex flow in the vicinity of swirler contour surfaces.

* * * * *